United States Patent
Jo et al.

(10) Patent No.: US 10,629,332 B2
(45) Date of Patent: Apr. 21, 2020

(54) LOW-TEMPERATURE SUPERCONDUCTING WIRE HAVING LOW STABILIZING MATRIX RATIO, AND SUPERCONDUCTING COIL HAVING SAME

(71) Applicant: KOREA ELECTROTECHNOLOGY RESEARCH INSTITUTE, Changwon (KR)

(72) Inventors: Young Sik Jo, Jinju (KR); Rock Kil Ko, Changwon (KR); Seog Whan Kim, Changwon (KR); Dong Woo Ha, Changwon (KR); Hyung Wook Kim, Changwon (KR); Chil Hoon Doh, Changwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 0 days.

(21) Appl. No.: 16/330,745

(22) PCT Filed: Nov. 22, 2016

(86) PCT No.: PCT/KR2016/013433
§ 371 (c)(1),
(2) Date: Mar. 5, 2019

(87) PCT Pub. No.: WO2018/048022
PCT Pub. Date: Mar. 15, 2018

(65) Prior Publication Data
US 2019/0228883 A1    Jul. 25, 2019

(30) Foreign Application Priority Data

Sep. 6, 2016 (KR) .......... 10-2016-0114596

(51) Int. Cl.
*H01B 12/04* (2006.01)
*H01B 1/02* (2006.01)
(Continued)

(52) U.S. Cl.
CPC .............. *H01B 12/04* (2013.01); *H01B 1/02* (2013.01); *H01B 12/14* (2013.01); *H01F 6/06* (2013.01); *Y02E 40/645* (2013.01)

(58) Field of Classification Search
CPC .............. H01B 12/04; H01B 1/02; H01F 6/06
(Continued)

(56) References Cited

U.S. PATENT DOCUMENTS 3,527,873 A * 9/1970 Habibo ................. H01B 12/12
174/15.5
3,958,327 A * 5/1976 Marancik ............... H01L 39/14
29/599

(Continued)

FOREIGN PATENT DOCUMENTS

| JP | H1017395 A | 1/1998 |
| JP | 2004517439 A | 6/2004 |
| JP | 2010010061 A | 1/2010 |

OTHER PUBLICATIONS

F. A. Chudnovskii et al. Electroforming and Switching in Oxides of Transition Metals: The Role of Metal-Insulator Transition in the Switching Mechanism (Year: 1996).*

(Continued)

*Primary Examiner* — Andargie M Aychillhum
*Assistant Examiner* — Michael F McAllister

(57) ABSTRACT

Provided is a low-temperature superconducting wire having a low stabilizing matrix ratio. The present invention provides a superconducting wire including: a low-temperature superconducting filament; a stabilizing Matrix encompassing the filament; and a sheath of a Metal-Insulator Transition (Continued)

(MIT) material, which encompasses the stabilizing matrix on the exterior of the stabilizing matrix. According to the present invention, a low stabilizing matrix ratio is achieved while coping with heat caused by a quench phenomenon, thereby reducing manufacturing cost and achieving a high current density.

11 Claims, 4 Drawing Sheets

(51) Int. Cl.
    *H01B 12/14*     (2006.01)
    *H01F 6/06*     (2006.01)

(58) Field of Classification Search
    USPC .................................................. 174/110 R
    See application file for complete search history.

(56) References Cited

U.S. PATENT DOCUMENTS

| | | | | |
|---|---|---|---|---|
| 4,094,060 | A * | 6/1978 | Madsen | H01L 39/2409 148/668 |
| 4,200,767 | A * | 4/1980 | Nomura | H01L 39/14 174/125.1 |
| 4,242,536 | A * | 12/1980 | Young | H01L 39/14 174/125.1 |
| 4,711,825 | A * | 12/1987 | Oberly | H01B 1/023 174/126.2 |
| 4,752,654 | A * | 6/1988 | Iida | H01L 39/14 174/125.1 |
| 4,791,241 | A * | 12/1988 | Ando | H01L 39/14 174/125.1 |
| 4,990,411 | A * | 2/1991 | Nakayama | H01L 39/14 148/98 |
| 4,997,719 | A * | 3/1991 | Ohshima | B32B 15/08 428/473.5 |
| 5,100,481 | A * | 3/1992 | Nakayama | H01L 39/14 148/98 |
| 5,603,983 | A * | 2/1997 | Clough | C04B 35/62847 427/126.3 |
| 6,344,287 | B1 * | 2/2002 | Celik | B32B 15/01 174/125.1 |
| 6,470,564 | B1 * | 10/2002 | Wada | H01B 12/10 174/125.1 |
| 6,828,508 | B1 * | 12/2004 | Ayai | H01L 39/143 174/125.1 |
| 7,210,216 | B2 * | 5/2007 | Egawa | H01L 39/2409 174/125.1 |
| 7,275,301 | B2 * | 10/2007 | Pourrahimi | H01F 6/06 174/125.1 |
| 2009/0184281 | A1 * | 7/2009 | Yadav | A61L 27/06 252/62.55 |
| 2013/0101848 | A1 * | 4/2013 | Banerjee | C09K 9/00 428/402 |
| 2014/0100118 | A1 * | 4/2014 | Doll | H01L 39/141 505/231 |
| 2014/0147398 | A1 * | 5/2014 | Hamilton | A61K 8/29 424/59 |
| 2015/0020706 | A1 | 1/2015 | Klement | |
| 2017/0243681 | A1 * | 8/2017 | Somerkoski | H01F 6/02 |

OTHER PUBLICATIONS

A.L. Pergament, "Metal-Insulator Transition Temperatures and Excitonic Phases in Vanadium Oxides," International Scholarly Research Network; ISRN Condensed Matter Physics; vol. 2011, Article ID 605913; Sep. 4, 2011; 5 pages.

Freeman et al., "Nanoscale Structural Evolution of Electrically Driven Insulator to Metal Transition in Vanadium Dioxide," Applied Physics Letters 103, 263109; Dec. 30, 2013; 4 pages.

International Search Report; PCT/KR2016/013433; dated May 22, 2017.

* cited by examiner

| Oxide | $T_t$, K |
|---|---|
| $V_2O_3$ | 150 |
| $V_3O_5$ | 450 |
| $V_4O_7$ | 240 |
| $V_5O_9$ | 130 |
| $V_6O_{11}$ | 170 |
| $V_8O_{15}$ | 70 |
| $V_6O_{13}$ | 150 |

US 10,629,332 B2

LOW-TEMPERATURE SUPERCONDUCTING WIRE HAVING LOW STABILIZING MATRIX RATIO, AND SUPERCONDUCTING COIL HAVING SAME

CROSS-REFERENCE TO RELATED APPLICATIONS

This application is a U.S. National Stage of PCT/KR2016/013433 filed Nov. 22, 2016, which claims the priority benefit of Korean Patent Application No. 10-2016-0114596, filed on Sep. 6, 2016, in the Korean Intellectual Property Office.

TECHNICAL FIELD

The present invention relates to low-temperature superconducting wire, and more particularly, to a low-temperature superconducting wire having a low stabilizing matrix ratio.

BACKGROUND ART

A low-temperature superconducting wire, which is operated at a liquid helium temperature, uses a filament-type wire, which is made of a metal alloy, as a superconducting wire. The low-temperature superconducting wire generates a high magnetic field and the low-temperature superconducting wire is easily super-conductively joined, so that the low-temperature superconducting wire is widely used in Magnetic Resonance Imaging (MRI) or Nuclear Magnetic Resonance (NMR), a nuclear fusion device, a large collider, and the like. The superconducting wire in the form of a filament in the related art has a structure covered by a stabilizing matrix.

FIG. 1 is a cross-sectional view schematically illustrating a cross-section structure of a coil manufactured with a low-temperature superconducting wire in the related art.

Referring to FIG. 1, a low-temperature superconducting wire 10 forming a coil includes filament-type superconducting wires 11 and a stabilizing matrix 12 encompassing the superconducting wires. An insulating sheath 13 by banish coating, a Kapton tape, or the like is formed on the exterior of the low-temperature superconducting wire.

The low-temperature superconducting wire in the related art has a very high metal stabilizing matrix ratio for protecting the wire from quench. For example, the low-temperature superconducting wire, in which a volume ratio of copper, which is a stabilizing matrix, and a superconducting wire is 7:1 or more, is used in a magnetic for MRI.

However, there is a problem in that a high stabilizing matrix ratio reduces a current density (Je) of the superconducting wire and increases manufacturing cost of the low-temperature superconducting wire.

DISCLOSURE

Technical Problem

In order to solve the problem in the related art, an object of the present invention is to present a superconducting wire structure, which is capable of achieving a low stabilizing matrix ratio.

Further, an object of the present invention is to provide a low-temperature superconducting wire having a high current density.

Further, an object of the present invention is to provide a low-temperature superconducting wire, which has a self-protecting function from a quench phenomenon generated during an operation of a superconducting magnet.

Further, an object of the present invention is to provide a superconducting coil including a low-temperature superconducting wire.

Technical Solution

In order to achieve the technical problem, the present invention provides a superconducting wire, including: a low-temperature superconducting filament; a stabilizing matrix encompassing the filament; and a sheath of a Metal-Insulator Transition (MIT) material, which encompasses the stabilizing matrix on the exterior of the stabilizing matrix.

In the present invention, the MIT material may have a transition temperature of a room temperature or lower. The MIT material may include a vanadium oxide, for example, VO. Further, the MIT material may include a minimum of one kind of material selected from the group consisting of $V_nO_{2n-1}$ (herein, n=2 to 9). Further, the MIT material may include a minimum of one kind of material selected from the group consisting of $Fe_3O_4$, $RNiO_3$ (R=La, Sm, Nd, or Pr). $La_{1-x}Sr_xNiO_4$ (herein, x<1), $NiS_{1-x}Se_x$ (herein, x−1), and $BaVS_3$.

In the present invention, the low-temperature superconducting filament may include a minimum of one kind of material selected from the group consisting of NbTi, NbZr, $Nb_3Sn$, $V_3Ga$, $Nb_3Ge$, and $Nb_3Al$.

Further, in order to achieve another technical problem, the present invention provides a low-temperature superconducting coil, in which a low-temperature superconducting wire including a low-temperature superconducting filament and a stabilizing matrix encompassing the filament is wound, in which an MIT material is interposed between adjacent low-temperature superconducting wires. In this case, an MIT material layer may have a structure which is in contact with the stabilizing matrix.

Advantageous Effects

According to the present invention, it is possible to provide a superconducting wire structure, which is capable of achieving a low stabilizing matrix ratio while coping with heat caused by a quench phenomenon. Accordingly, it is possible to reduce manufacturing cost and achieve a high current density.

BEST MODE

Hereinafter, the present invention will be described by describing exemplary embodiments of the present invention with reference to the accompanying drawings.

In the specification of the present invention, a low-temperature superconducting wire refers to a superconducting wire, in which a critical temperature of a superconducting material is lower than a liquid nitrogen temperature, compared to a high-temperature superconducting wire, in which a critical temperature is higher than a liquid nitrogen temperature. There is no absolute critical temperature based on which a low-temperature superconducting wire is discriminated, but roughly, a wire having a critical temperature lower than 77 K that is a liquid nitrogen temperature is a low-temperature superconducting wire. The superconducting wire is used by being cooled with liquid helium. Further, a low-temperature superconducting coil is applicable to a superconducting magnet of Magnetic Resonance Imaging (MRI), Nuclear Magnetic Resonance (NMR), a nuclear fusion device, a large collider, and the like.

Figure 1:
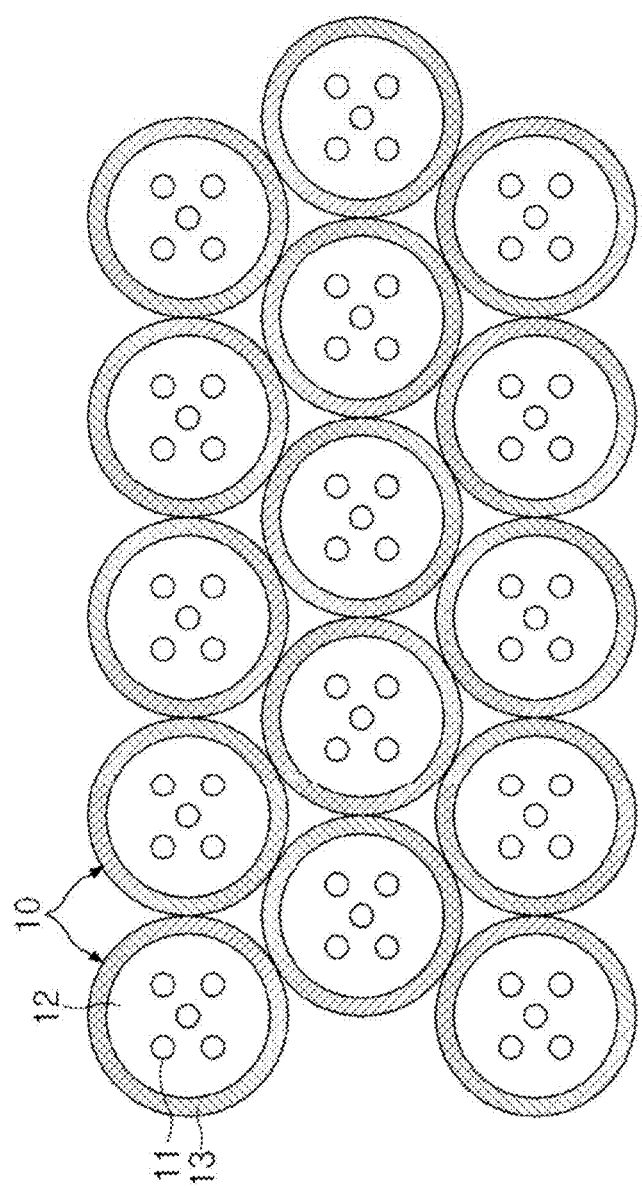
FIG. 1 is a diagram schematically illustrating a low-temperature superconducting coil in the related art.
Figure 2:
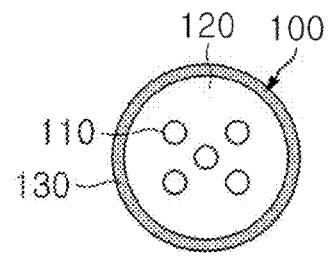
FIG. 2 is a diagram schematically illustrating a cross-section structure of a low-temperature superconducting wire according to an exemplary embodiment of the present invention.

FIG. 2 is a diagram schematically illustrating a cross-section structure of a low-temperature superconducting wire according to an exemplary embodiment of the present invention.

As illustrated in FIG. 2, a superconducting wire includes a low-temperature superconducting filament 110, and a stabilizing matrix 120 encompassing the superconducting filaments 110. A Metal-Insulation Transition (MIT) layer is formed on the exterior of the stabilizing matrix 120.

In the present invention, the low-temperature superconducting filament 110 may be formed of a minimum of one kind of superconducting material selected from the group consisting of NbTi, NbZr, $Nb_3Sn$, $V_3Ga$, $Nb_3Ge$, and $Nb_3Al$. In the present invention, the filament 110 has a longitudinally extended predetermined shape, regardless of a shape of a cross-section. As illustrated, in the present invention, the filament 110 may have a wire form, of which a cross-section has a circular shape, but unlike this, the filament 110 may have a hollow pipe form including an internal structure. Further, the filament may also include an additional metal layer or superconducting material layer on the interior or exterior thereof.

In the present invention, as the stabilizing matrix, a conductive metal, such as copper, aluminum, and silver, may be used.

In the meantime, the MIT refers to a material which has low electrical conductivity at a temperature lower than a predetermined temperature (transition temperature) to operate as an insulator, but exhibits a sharp increase in electrical conductivity at a temperature of the transition temperature or higher.

Even in the specification of the present invention, the MIT is used as the substantially same meaning as a general usage thereof. However, the MIT suitable for the present invention has a transition temperature equal to or higher than a critical temperature of a superconducting wire and has an electrical conductivity rate before and after a section including the transition temperature of preferably $10^3$ or more, more preferably, $10^5$ or more.

In the present invention, the MIT has a transition temperature equal to or higher than a critical temperature of a superconducting material used in the wire. A transition temperature of the MIT may be preferably less than a critical temperature of the superconducting material+150 K. and more preferably, less than the threshold temperature+100 K. Further, in consideration of the feature that high heat enough to cause burn-out of the coil is generated when the quench is generated, a transition temperature of the MIT usable in the present invention may be around a room temperature. As a matter of course, the transition temperature of the MIT may be equal to or higher than the critical temperature of the superconducting material, but is not essentially limited thereto.

An example of the MIT material suitable for the present invention may include a vanadium oxide. A $V_2O_3$ phase in the vanadium oxide is divided into a typical insulator, but the vanadium oxide of a composition of VO, $VO_2$, and $V_nO_{2n-1}$ (herein, n=2 to 9) has a transition temperature and exhibits an electrical metal-insulator transition characteristic.

Figure 3:
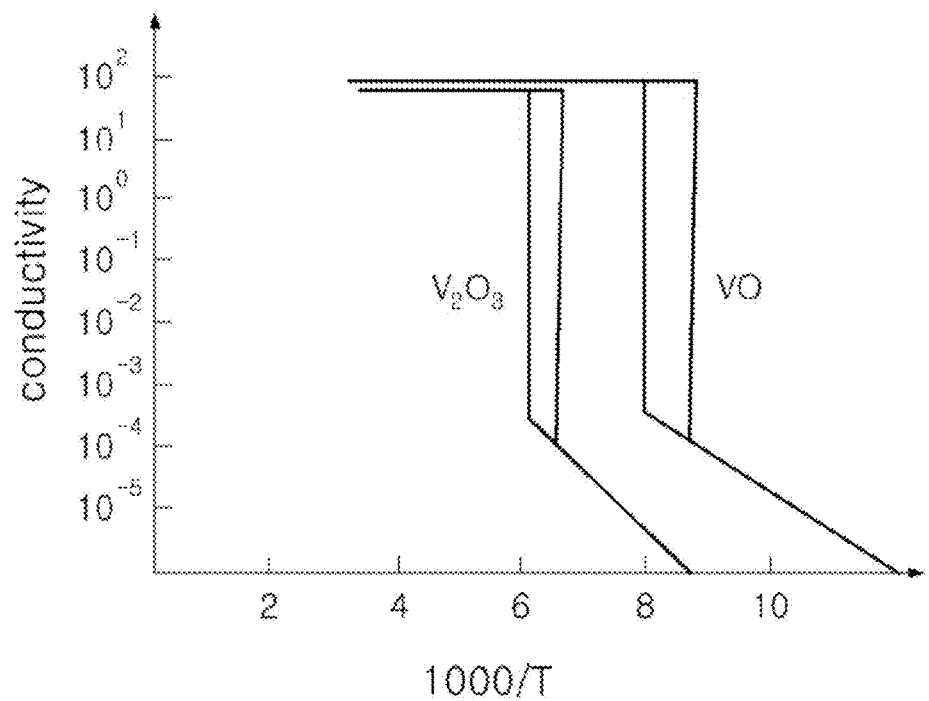
FIG. 3 is a graph schematically illustrating an electrical conductivity characteristic according to temperatures of VO and $V_2O_3$ as an example of a Metal-Insulation Transition (MIT) material of the present invention.

FIG. 3 is a graph schematically illustrating an electrical conductivity characteristic according to temperatures of VO and $V_2O_3$ as an example of a Metal-Insulation Transition (MIT) material of the present invention.

Referring to FIG. 3, changes in electrical conductivity of the MIT during temperature increasing and decreasing processes progress different paths, such as a hysteresis loop. In the case of the VO, when a temperature increases, electrical conductivity sharply increases by $10^3$ times or more around 123 K (−150° C.) that is the transition temperature, and in the case of the $V_2O_3$, electrical conductivity sharply increases by $10^3$ times or more around 163 K (−110° C.).

Figures 4, 5:
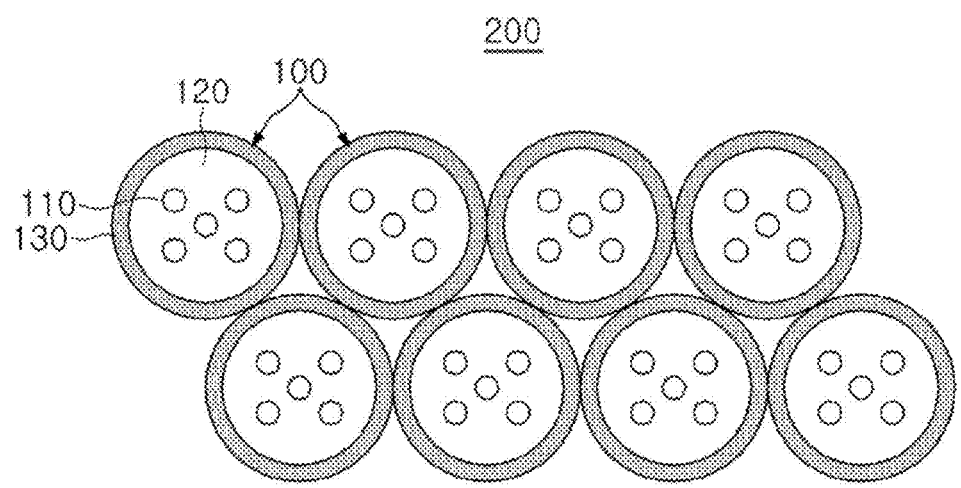
FIG. 4 is a diagram illustrating a transition temperature of a vanadium oxide according to another exemplary embodiment of the present invention.
FIG. 5 is a diagram illustrating a cross-section structure of a superconducting coil according to an exemplary embodiment of the present invention.

FIG. 4 is a diagram illustrating a transition temperature of a vanadium oxide according to another exemplary embodiment of the present invention.

A transition temperature value of the vanadium oxide expressed by $V_nO_{2n-1}$ (n=2 to 9) may be calculated with an appropriate model. FIG. 4 represents a value of a transition temperature $T_t$ presented in "Metal-Insulator Transition Temperatures and Excitonic Phases in Vanadium Oxides", by A. L. Pergament, International Scholarly Research Network ISRN Condensed Matter Physics Volume 2011, Article ID 605913, 5 pages, as an example of the transition temperature.

In the meantime, in the present invention, as the MIT material, various materials exemplified below may be used.

TABLE 1

| Marerial | Transition temperature | Resistance ratio |
|---|---|---|
| $Fe_3O_4$ | 120 K | 100 to 1000 |
| $RNiO_3$ (R = La, Sm, Nd, Pr) | 130 to 240 K | 100 to 1000 |
| $La1-xSrxNiO_4$ | 40 to 240 K | 100 to 10000 |
| $NiS_{1-x}Se_x$ | 80 to 260 K | 10 to 100 |
| $BaVS_3$ | 74 K | 10000 to 100000 |

MODE FOR CARRYING OUT THE INVENTION

FIG. 5 is a diagram illustrating a cross-section structure of a superconducting coil according to an exemplary embodiment of the present invention.

Referring to FIG. 5, a superconducting coil 200 has a winding structure of a plurality of superconducting wires 100. In the present invention, the winding structure of the superconducting coil is not particularly limited. For example, the superconducting coil may have a winding structure of a solenoid scheme.

In the illustrated drawing, each superconducting wire 100 includes a low-temperature superconducting filament 110, a stabilizing matrix 120, and an MIT layer 130.

Within the superconducting coil, each superconducting wire 100 is in contact with a minimum of one another superconducting wire in an upper or lateral direction, and as a result, the superconducting wire 100 is adjacent to another superconducting wire 100 with the MIT layer 130 interposed therebetween. In the foregoing structure, quench is generated in the superconducting wire 100, and when a temperature of the corresponding superconducting wire is increased due to the heat according to the generation of the quench to become a transition temperature of the MIT layer 130 or higher, the MIT layer 130 acts as a conductive path. Accordingly, a current of the superconducting wire 100, in which the quench is generated, may bypass to the adjacent superconducting wire 100.

In the foregoing coil structure, there is an advantage in that when each superconducting wire satisfies a specific temperature condition according to an operation state, the superconducting wire is capable of escaping from an electrically isolated state within an insulating material. That is, in the coil structure of the present invention, the superconducting wire may use the stabilizing matrix of the adjacent superconducting wire as a bypass path. Accordingly, a ratio of the stabilizing matrix configuring each wire may be considerably decreased.

In the present invention, the MIT layer 218 may be coated by an appropriate application method. For example, the MIT layer 218 may be formed by sputtering. Unlike this, a wet method of forming the required MIT layer 218 from a solution in the form of a paste may be used as a matter of course. To this end, a polymer material may also be used as a binder of the MIT material, and further, in this case, the polymer binder may also include conductive polymer.

Further, unlike this, the MIT layer may also be formed by a method of welding or joining a separately manufactured strip-type MIT layer.

Figure 6:
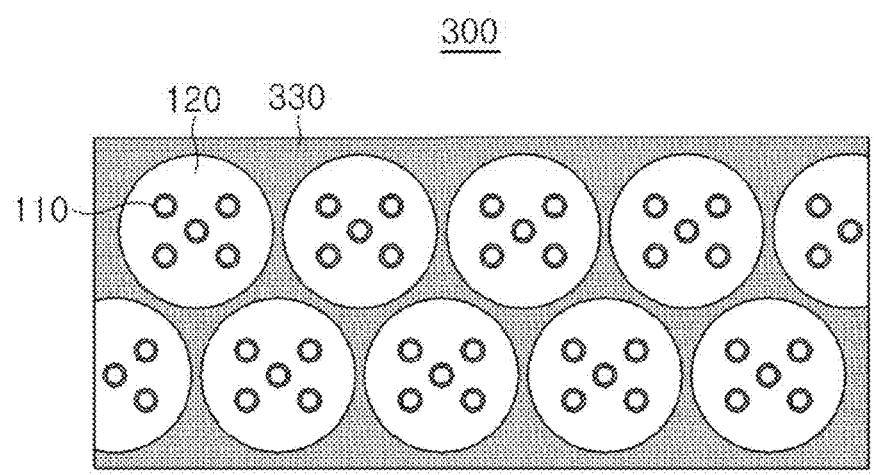
FIG. 6 is a diagram illustrating a cross-section structure of a superconducting coil according to another exemplary embodiment of the present invention.

FIG. 6 is a diagram schematically illustrating a cross-section structure of a superconducting coil according to another exemplary embodiment of the present invention.

Referring to FIG. 6, a low-temperature superconducting wire 100 including a low-temperature superconducting filament 110 and a stabilizing matrix 120 encompassing the low-temperature superconducting filament is wound within a matrix phase of an MIT layer 330. Even in this case, the superconducting wires 100 are in contact with each other with the MIT layer 330 interposed therebetween. The present exemplary embodiment is different from the exemplary embodiment of FIG. 5 in that the MIT layer 330 is not provided in the form of a sheath of each wire.

In the present exemplary embodiment, the MIT layer 330 may be provided by various schemes. For example, the MIT layer 330 may be manufactured by impregnating the superconducting wire formed of the superconducting filament 110 and the stabilizing matrix 120 with an MIT solution or impregnating the coil, in which the superconducting wire is wound, with an MIT solution, and then molding and drying the superconducting wire or the coil.

The exemplary embodiments of the present invention have been described with reference to the accompanying drawings, but those skilled in the art will understand that the present invention may be implemented in another specific form without changing the technical spirit or an essential feature thereof. Thus, it is to be appreciated that the embodiments described above are intended to be illustrative in every sense, and not restrictive.

INDUSTRIAL APPLICABILITY

The present invention is applicable to a superconducting magnet of Magnetic Resonance Imaging (MRI), Nuclear Magnetic Resonance (NMR), and the like.

The invention claimed is:

1. A superconducting wire, comprising:
   a low-temperature superconducting filament;
   a stabilizing matrix encompassing the filament; and
   a sheath of a Metal-Insulator Transition (MIT) material, which encompasses the stabilizing matrix on the exterior of the stabilizing matrix,
   wherein the MIT material has a transition temperature of a room temperature or lower.

2. The superconducting wire of claim 1, wherein the MIT material has a transition temperature of less than a critical temperature of the superconducting filament+150 K.

3. The superconducting wire of claim 1, wherein the MIT material has a transition temperature of less than a critical temperature of the superconducting filament+100 K.

4. The superconducting wire of claim 1, wherein the MIT material includes a vanadium oxide.

5. The superconducting wire of claim 1, wherein the MIT material includes VO.

6. The superconducting wire of claim 1, wherein the MIT material includes a minimum of one kind of material selected from the group consisting of $V_nO_{2n-1}$ (herein, n=2 to 9).

7. The superconducting wire of claim 1, wherein the MIT material includes a minimum of one kind of material selected from the group consisting of $Fe_3O_4$, $RNiO_3$ (R=La, Sm, Nd, or Pr), $La_{1-x}Sr_xNiO_4$ (herein, x<1), $NiS_{1-x}Se_x$ (herein, x<1), and $BaVS_3$.

8. The superconducting wire of claim 1, wherein the low-temperature superconducting filament includes a minimum of one kind of material selected from the group consisting of NbTi, NbZr, $Nb_3Sn$, $V_3Ga$, $Nb_3Ge$, and $Nb_3Al$.

9. A low-temperature superconducting coil, in which a low-temperature superconducting wire including a low-temperature superconducting filament and a stabilizing matrix encompassing the filament is wound,
   wherein a Metal-Insulator Transition (MIT) material is interposed between adjacent low-temperature superconducting wires, and
   wherein the MIT material has a transition temperature of a room temperature or lower.

10. The low-temperature superconducting coil of claim 9, wherein the MIT material is in contact with the stabilizing matrix.

11. The low-temperature superconducting coil of claim 9, wherein the low-temperature superconducting wire is a first low-temperature superconducting wire, the stabilizing matrix of the first low-temperature superconducting wire is a first stabilizing matrix, and the filament of the first low-temperature superconducting wire is a first filament, the coil further comprising a second low-temperature superconducting wire disposed adjacent to the first low-temperature superconducting wire, the second low-temperature superconducting wire including a second filament and a second stabilizing matrix encompassing the second filament, and
   wherein the MIT material is in contact with the first stabilizing matrix and the second stabilizing matrix.

* * * * *